United States Patent
Sagie et al.

(10) Patent No.: US 11,122,115 B1
(45) Date of Patent: Sep. 14, 2021

(54) WORKLOAD DISTRIBUTION IN A DATA NETWORK

(71) Applicant: International Business Machines Corporation, Armonk, NY (US)

(72) Inventors: Gal Sagie, Hod-HaSharon (IL); Eran Gampel, Herzliya (IL)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 15/844,687

(22) Filed: Dec. 18, 2017

Related U.S. Application Data

(60) Provisional application No. 62/435,912, filed on Dec. 19, 2016.

(51) Int. Cl.
| | |
|---|---|
| *H04L 29/08* | (2006.01) |
| *H04L 12/741* | (2013.01) |
| *H04L 12/851* | (2013.01) |
| *G06N 3/08* | (2006.01) |
| *H04L 12/935* | (2013.01) |
| *H04L 12/46* | (2006.01) |
| *H04L 29/06* | (2006.01) |
| *H04L 12/751* | (2013.01) |

(52) U.S. Cl.
CPC ......... *H04L 67/1008* (2013.01); *G06N 3/084* (2013.01); *H04L 12/4633* (2013.01); *H04L 12/4641* (2013.01); *H04L 45/08* (2013.01); *H04L 45/74* (2013.01); *H04L 47/2425* (2013.01); *H04L 47/2441* (2013.01); *H04L 49/3063* (2013.01); *H04L 69/22* (2013.01)

(58) Field of Classification Search
CPC ...................................................... H04L 45/70
See application file for complete search history.

(56) References Cited

U.S. PATENT DOCUMENTS

| | | | | |
|---|---|---|---|---|
| 8,977,774 | B2* | 3/2015 | Baden | H04L 47/10 709/233 |
| 2003/0227383 | A1* | 12/2003 | Berry | G08B 21/12 340/540 |
| 2010/0299437 | A1* | 11/2010 | Moore | H04L 67/1008 709/226 |
| 2011/0158256 | A1* | 6/2011 | Qiu | H04L 49/9042 370/474 |

(Continued)

OTHER PUBLICATIONS

Direct Access Media (DMA) Controller in Computer Architecture, first page retrieved on Mar. 8, 2021 from the Internet: <URL: https://www.geeksforgeeks.org/direct-access-media-dma-controller-in-computer-architecture/ >.

*Primary Examiner* — Moustafa M Meky
*Assistant Examiner* — Sm Z Islam
(74) *Attorney, Agent, or Firm* — Schmeiser, Olsen & Watts, LLP; Stephanie Carusillo

(57) ABSTRACT

A system for processing packets in a network is provided. The system includes a computing platform running a software framework configured for accessing packets flowing into a packet processing pipeline of a node in the network; and identifying at least one pattern in said packets. Based on this pattern, the systems routes a first portion of the packets into the packet processing pipeline and offloads a second portion of the packets to the computing platform to be processed by the software framework.

17 Claims, 5 Drawing Sheets

(56) References Cited

U.S. PATENT DOCUMENTS

| | | | |
|---|---|---|---|
| 2013/0215897 A1* | 8/2013 | Warren | H04L 69/22 370/392 |
| 2014/0149273 A1* | 5/2014 | Angell | G06Q 40/04 705/37 |
| 2016/0073096 A1* | 3/2016 | Hillebrand | H04N 13/296 348/47 |
| 2016/0380885 A1* | 12/2016 | Jani | H04L 45/44 370/408 |
| 2017/0126795 A1* | 5/2017 | Kumar | H04L 41/5012 |
| 2017/0214774 A1* | 7/2017 | Chen | H04L 12/46 |

* cited by examiner

WORKLOAD DISTRIBUTION IN A DATA NETWORK

RELATED APPLICATION

This application claims the benefit of priority under 35 USC § 119(e) of U.S. Provisional Patent Application No. 62/435,912, filed on Dec. 19, 2016, the contents of which are incorporated herein by reference in their entirety.

BACKGROUND

The present invention relates to a system for workload distribution in a data network and, more particularly, to a software framework which can route and process packet streams thereby offloading packet processing from dedicated hardware devices such as routers and firewalls.

Data networks such as the internet enable network devices to exchange data using a data link which is established via cable or wireless media.

Data is transmitted across the network as suitably sized blocks, called packets which are routed through the network based on the destination address contained within each packet. Packets are composed of a header and payload. Information in the header is used by networking hardware (forming a part of the data plane of the network) to direct the packet to its destination where the payload is extracted and used by application software.

Forwarding packets through the network based on their destination address (termed "packet switching") allows the same data path to be shared among many users in the network thereby increasing network efficiency, robustness and enabling technological convergence of many applications operating on the same network.

In packet switching networks, routing directs packet forwarding (the transit of logically addressed network packets from their source toward their ultimate destination) through intermediate nodes. Intermediate nodes are typically network hardware devices (HW) such as routers, bridges, gateways, firewalls, or switches (also referred to herein as "network devices"). The routing process usually directs forwarding on the basis of routing tables, which maintain a record of the routes to various network destinations on each hardware device. These routing tables, which are held in the device memory, are crucial for efficient routing.

Although each HW can efficiently perform various packet processing tasks for a limited number of rules, the number of supported rules is dependent on the HW and is predefined by the HW application specific integrated circuit (ASIC).

A typical HW packet processing pipeline is shown in FIG. 1. The Frame Processing Pipeline parser unit analyzes the frame header and forwards decisions to downstream units. The FFU performs frame lookup and associates actions with the frame, the L3 unit assigns a destination media access control address (MAC address) or virtual LAN (VLAN) using the destination IP address (IP Routing) and the L2 assigns a destination MAC address and a source MAC lookup using the MAC table in order to select an output port and perform learning.

Each of these units in the pipeline is associated with a configuration table—access central list (ACL) for the FFU, routing table for the L3 unit and lookup MAC table for the L3 unit. A host central processing unit (CPU) which forms a part of the HW controller provides each unit with the appropriate configuration table.

SUMMARY

According to one aspect of the present invention there is provided a system for processing packets in a network comprising a computing platform running a software framework configured for accessing packets flowing into a hardware (HW) packet processing pipeline of a node in the network; identifying at least one pattern in the packets; and based on the at least one pattern, routing a first portion of the packets into the packet processing pipeline and offloading a second portion of the packets to the computing platform to be processed by the software framework.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION

Figure 1:
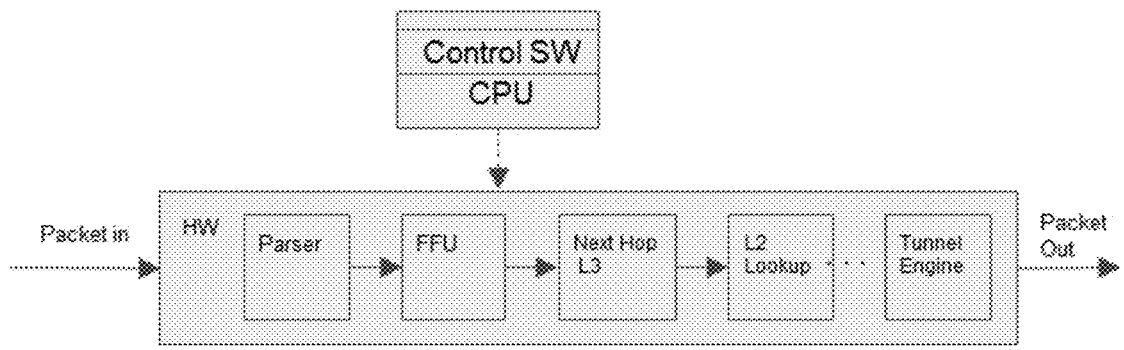
FIG. 1 is a diagram illustrating prior art packet stream processing through a network device.

Embodiments of the present invention relate to a software framework which can be used to enhance packet processing in a data network. Specifically, embodiments of the present invention can be used to route specific packets to a software packet processing framework based upon learned packet patterns in a packet stream.

The principles and operation of the present invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Recent years have seen a paradigm shift in network architecture, hardware-based dedicated networking devices are gradually replaced with software-based network services running on generic CPUs. This shift is largely due to the fact that the static architecture of traditional HW networks is incapable of supporting the dynamic, scalable computing and storage needs of modern computing environments such as data centers.

As opposed to HW-based networking services, SW-based networking services are dynamic, manageable, cost-effective, scalable and adaptable. SW-based networking [as embodied by the Software Define Network (SDN) architecture] enables one to program network control and connect underlying infrastructure to applications and network services and thus provides an open, scalable architecture that can be adapted to needs over time.

Although SW-based networking services represent the future of networking, services such as packet processing are still more efficiently carried out via dedicated hardware devices.

In a hardware-based network, packets are processed by network controller or by an interface controllers (NICs). NICs are hardware devices (typically implemented as PCI cards) that are programmed for a specific task in most cases Ethernet controller, in recent years the network adapter HW are becoming "Smarter" and include additional functionality e.g. L2 switching, L3 Routing, tunneling engine and more. Due to their dedicated configuration, NICs are efficient at their specified task however, such efficiency comes at the expense of flexibility. Network devices utilize preprogrammed data tables that provide rules for packet processing. Although these tables are periodically updated, HW-based network devices still suffer from resource limitation, inflexibility and limited programmability.

The preprogrammed data tables are limited in size due to the expensive cost of adding memory to the ASIC chip. One limitation of HW processing is imposed when the MAC table or routing tables are full, limiting scaling of the L2 domain or L3 network depending on the HW table size. The size of the L2 MAC table defines how many different L2 entities the switch can support (the scale of the L2 domain), the routing table defines the scale and size of your L3 domain. Some of the rules in such tables are rarely used but must be there in order to support connectivity.

Another limitation of HW processing results from repeated processing (reprocessing) for each packet as it traverses through different HW devices (router, switch, firewall etc.) in a packet processing pipeline. Reprocessing can involve simple header classification or complex deep packet inspection (DPI) or stateful information about connection and sessions.

Yet another Limitation of HW routing is that a policy configuration must be applied to all HW devices in the packet chain, in most cases reducing the policy to the lower dominator features set, and creating a management bottleneck. Examples of policy configurations can be Quality of service (QoS), security, isolation, overlay and more.

Embodiments of the present invention to practice provide a packet routing approach which harnesses the packet processing efficiently of HW-based controllers and enhances it with software-based packet processing.

As is further described hereinunder, embodiments of the packet routing approach include a software framework configured for identifying and offloading packets not suitable for processing by the hardware layer based on patterns learned over time. The software framework is further configured for processing and routing offloaded packets thereby substantially enhancing the packet processing efficiency of a network node.

Thus, according to one aspect of the present invention there is provided a system for processing packets in a network. As used herein, the phrase processing packets refers to packet routing, packet switching, packet mangling (altering), packet filtering, packet inspection, packet analysis, packet distribution (load balancing) and the like.

The present system includes a computing platform (e.g. any off-the-shelf (COTS) processing unit) running a software framework configured for accessing packets flowing into a packet processing pipeline of a node in the network, identifying at least one pattern in the packets and based on this pattern, routing a first portion of packets into the packet processing pipeline and offloading a second portion of the packets to the computing platform to be processed by the software framework.

The packet processing pipeline can include any type of network hardware device (network interface controller) e.g. router, switch, firewall. Pattern generation and processing of packets will depend on the type of packet processing pipeline and its functionality (packet routing, firewall, load balancer, packet inspection, and any other security function).

Figure 2:
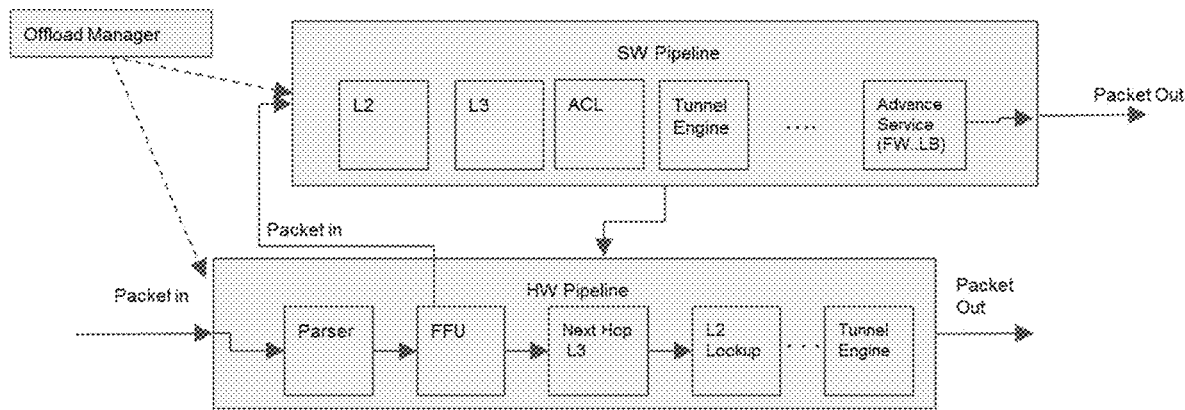
FIG. 2 is a diagram illustrating packet offloading in the packet processing system of embodiments of the present invention.
Figure 3:
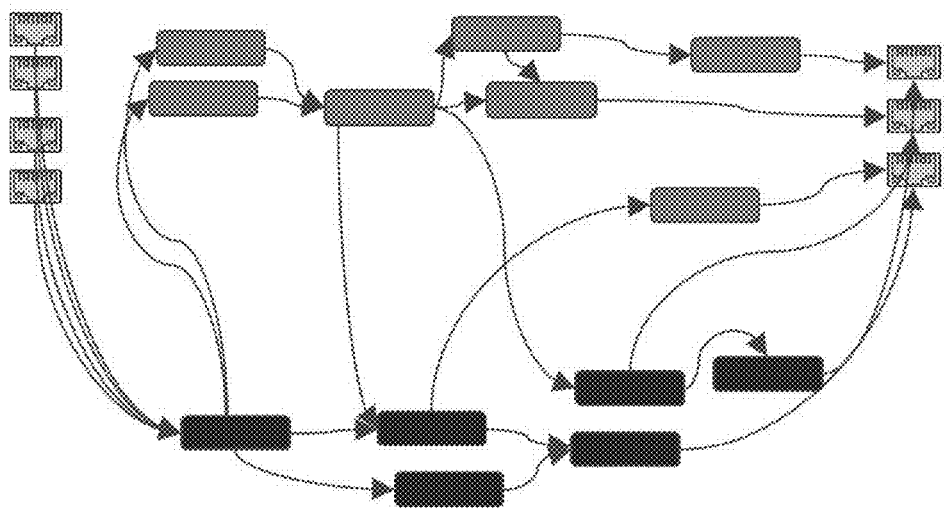
FIG. 3 is a diagram illustrating a logical view of the HW pipeline and SW pipeline processing as one processing pipeline, it illustrates an adaptive system capable of SW and HW packet processing on the same processing graph.
Figure 4:
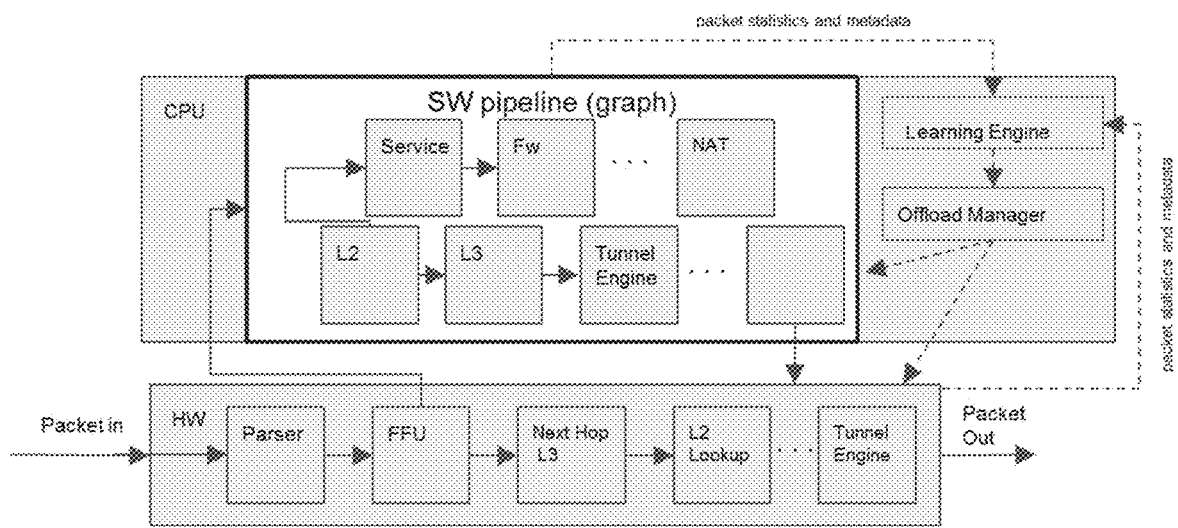
FIG. 4 is a diagram illustrating the packet pattern learning and offload components of the packet processing system of embodiments of the present invention.

FIGS. 2-4 schematically illustrate embodiments of the present system as implemented in a hardware-based packet processing pipeline of a network node. FIG. 2 illustrates general layout and interconnectivity of the HW and SW components of the packet processing pipeline of embodiments of the present invention.

Most commodity CPUs implement architectures that feature instructions for a form of vector processing on multiple (vectorized) data sets, typically known as SIMD (Single Instruction, Multiple Data). Common examples include Intel x86's MMX, SSE and AVX instructions, Sparc's VIS extension, PowerPC's AltiVec, and MIPS' MSA. Parallel processing for packets is used in most networking HW appliances.

The same approach can be applied to SW packet processing by processing a batch of packets through a processing pipeline with each unit in the pipeline having multiple inputs and outputs connected to other units thus creating a packet processing graph. In most cases, when processing packets in batches less CPU cache misses are encountered thus achieving the desired performance and latency in SW processing.

Embodiments of the present system include a learning engine and an offload manager for processing packets.

The learning engine receives as input the following:
 (i) Packet statistics stream or a mirrored packet stream or the packet themselves (in line in the processing pipeline);
 (ii) The state of the task/unit tables occupancy in HW and SW;
 (iii) The latency for each task/unit when performed in HW and SW;
 (iv) The capabilities of the associated HW pipeline; and/or
 (v) The traffic policy and known patterns.

The learning engine identifies and stores patterns (further described below) in order to make predictions with respect to the data stream, suggesting how to optimize the SW and HW packet processing graphs according to a learned policy.

The Learning Engine will be configured with the required policy (latency, performance, power consumption) from the system and will understand which part for which traffic segment will be performed in HW and which in SW, understanding the total required SLA (latency, maximum processed packet per second, power consumption).

The learning engine can utilize simple algorithms such as Logistic Regression, the Back Propagation Neural Network, Tree-based methods, instance-based algorithms or advanced deep learning algorithms such as Artificial Neural Networks like Deep Boltzmann Machine (DBM), Deep Belief Networks (DBN), Convolutional Neural Network (CNN), Stacked Auto-Encoders and the like.

The learning engine will monitor packet processing following optimization, and learn, on the fly, if a prediction improved overall system state according to the policy (SLA).

The offload manger is responsible for configuration of the local HW pipeline and SW pipeline graphs and receives as input a user-generated configuration. This configuration is translated by the offload manager into the HW and SW pipeline configuration table per unit/task. The offload manager also receives as input instructions from the learning engine for rule distribution and if applicable, applies any suggested changes to the SW and HW graphs.

Offloading of packets to the SW graph can be effected through PCI or Ethernet Port controllers or any other approach that can redirect the packets to a COTS processing machine.

Embodiments of the present system can access the packet stream of a single node in a network, or several nodes. In the latter case, embodiments of the present system can generate patterns based on packet flow through several nodes having similar or different functionality. Generated patterns can be shared by nodes and/or shared by interconnected units of the present system. Since embodiments of the present system utilize software to perform hardware functions, they are highly adaptable and scalable.

FIGS. 2-4 illustrate the SW processing graph and the HW processing graph that cooperate to produce an optimized packet processing graph. A packet traverses HW and SW processing units that can share the parsed metadata and state, from the ingress port (packet in) to the egress port (packet out). The present system can be adjusted by the manager/controller based on learning engine and the SLA configuration.

In the configuration shown in FIG. 2, the offload manager of embodiments of the present system classifies incoming packet traffic and routes each packet to the HW or SW layer. In the configuration shown in FIGS. 3 and 4, packet traffic is classified and parsed at the first two HW processing units (e.g. parser and FFU—FIG. 4) and routed accordingly to the SW or HW layer.

A packet that can be fully processed by the HW will be offloaded to HW and a packet that is classified for high level service will be routed to the SW (L2) for processing.

The classification unit (e.g. FFU) or offload manager can also be configured to route all top priority packets to HW and any unclassified/unmatched packet is then automatically sent to the SW layer to be processed according to a SW routing table.

As is mentioned hereinabove, one of the roles of the learning engine is identification and logging of packet patterns.

In order to identify such patterns, the learning engine classifies packets flowing into the packet processing pipeline to thereby derive one or more parameters that can be used to establish a pattern.

Once a pattern is identified by the learning engine, it is stored thereby and used in a configuration table of the offload manager to split incoming packet streams between the packet processing pipeline and the present system (as is shown in FIG. 4).

Several types of patterns can be used by embodiments of the present system to determine which packets are offloaded and which are routed through the packet processing pipeline. A pattern can be time-based (time of day, day of week etc.), header-based (e.g., specific range of IP addresses), payload-based and/or volume based and/or based on repetitiveness of a parameter. The parameters (or features in machine learning terms) used for generating the pattern will depend on the type of processing executed at the packet processing pipeline, they can be user generated or selected or generated by algorithms configured for unsupervised or semi-supervised feature/parameters learning and hierarchical feature extraction (deep learning algorithms).

For example, a time-based pattern can be derived from packets flowing into a node between certain hours, days of the week, month of the year etc. Such a pattern can be used to predict recurrent volume of traffic and adjust the HW-SW pipeline accordingly.

Additional types of patterns can be, for example, recurrent, volume, volume per application, application behavior, endpoint locations, statistical security risk, known security attack patterns, short peak volume, client types (by device or browser signature or user), protocol health (retransition, timeouts), and user workload statistics.

For example, a short peak volume pattern can recognize short peaks in traffic over time, in such cases it is better not to keep adjusting and re-adjusting the pipeline, such adjustment could cause un-needed overhead in processing.

An endpoint location pattern can be used to predict the best location for a service with consideration for the location of endpoints thus improving the overall system performance and latency.

A volume per application pattern can be used to predict application requirements from the software (for using high level services) and used to adjust the pipeline accordingly to address these requirements before time.

While the patterns generated by embodiments of the present system form the basis for packet offloading decisions, it will be appreciated that the present system can also take into account other factors that affect network efficiency such as detecting security anomalies, detect DOS or DDOS attack, learn a better placement of service in the system, learn best placement for network responder e.g., ARP responder or DHCP responder, learn best placement of service by the relevant HW capabilities, detect protocol or application health problem and adjust the processing pipeline, in the offload decision process.

Thus, in order to ensure that packet processing efficiency is maximized, the software framework of embodiments of the present system will utilize both patterns and global parameters in making a decision whether to offload a packet or not.

As is mentioned hereinabove, the packet processing pipeline accessed by embodiments of the present system can have one or more functions (routing, firewall etc.).

The following provides several use scenarios for embodiments of the present system in a network node having a hardware-based packet processing pipeline.

(i) Classify traffic as processed by hardware—traffic flow enters the software pipeline and is classified. The learning engine learns that all actions can be applied by the local HW components and configures hardware through specific HW interfaces to handle flow. The next stream is handled by HW without any intervention from the system.

(ii) Offload largest volumes—the system classifies flow to be handled by the HW as described above. The system then identifies and classifies peak packet volume time to generate a time-based pattern. Pattern is then triggered at specific time periods to automatically route packets to HW.

(iii) Learn traffic application latency and quality of service policy over time (iv) identify patterns relating to TCP timeouts, TCP retries, retransmits of the same packets over time, deep packet inspection (DPI) and use of accumulated data for a specific application (DB, web application, etc.) and packet size (packet per second) and prioritize and rank such packet streams to be processed by HW.

(v) Learn largest routing entries—recognize the routing entries that have the largest packet volume and route such streams to HW, route dynamic and often changing routing entries to software.

(vi) Split work across two processing functions—traffic (packet streams) can pass through two processing layers (devices or software entities) from source to destination. The learning engine identifies the less loaded layer and performs the processing on that layer.

(vii) Adaptive security protection—the system classifies attack patterns and automatically modifies the processing pipeline to include security functions such as TCP SYN authentication, HTTP transparent authentication, SYN proxy, amplification attack scrubbing (ICMP, DNS) and more that are specific to the current attack (no extra overhead). The system can switch between mitigation security functions on the fly to identify the optimal defense to a specific attack. Various mitigation approaches can be pre-configured and used according to the types of attacks.

(viii) Learn banned Distributed Denial of Service (DDoS) IPs—the learning engine can identify (from the packet stream) that the client is an infected host or is instigating a DDoS attack. The client identification (source IP address) is distributed across the entire data center and the source IP is blocked on other systems. Banned DDoS entities can also be recognized by the device signature or by the browser signature; this information can be distributed across the entire data center in order to block the specific signature.

Figure 5:
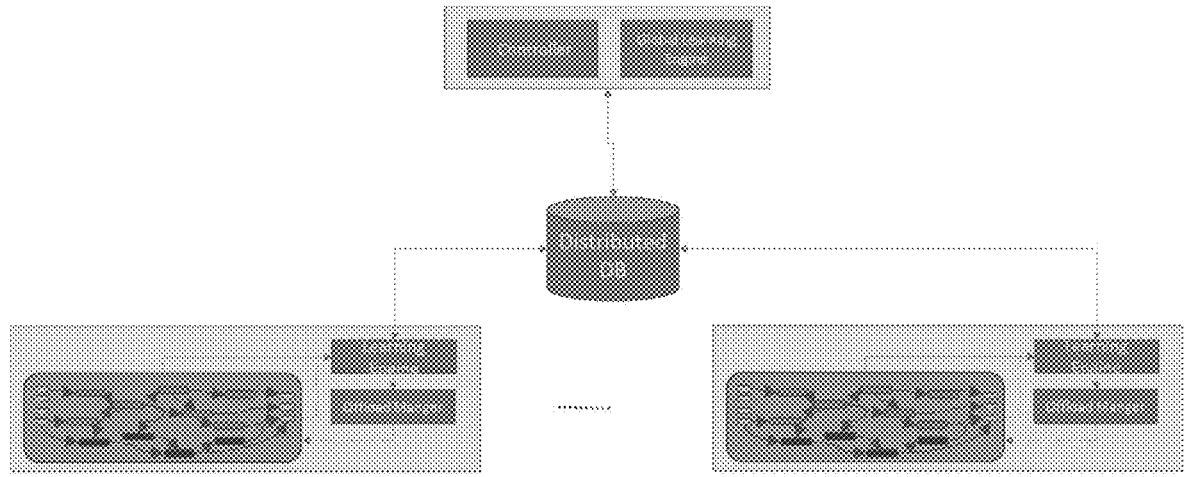
FIG. 5 schematically illustrates an example of adaptive distributed system using packet learning and offload component from FIG. 4 on each node and a logically distributed learning engine with the complete system view. This Figure illustrates that the learning process can be shared across different systems and is not bound to only one computational unit.

(ix) Location based learning of distributed load balancer functions—The present system is distributed across the data center (several 'units', e.g., a unit per server rack). A load balancer function usually has a VIP (virtual IP) address and this address can lead to a pool of backend servers. For example, VIP 10.0.0.1 and backend servers 192.168.0.1, 192.168.0.2, 192.168.0.3. The clients all connect to the VIP (10.0.0.1) and the load balancer directs each client to a different backend server. The present system can include many such VIP groups with each VIP served by a unit (copy) of the present system. The system learns the location of the backend servers and deploy for each specific VIP the load balancer as close as possible to the majority of the backend servers (if such exists). Such an architecture of the present system is illustrated in FIG. 5.

(x) Function placement according to HW capabilities— the system 'catalogs' the hardware of each node (based on specification such as CPU power, cache size, AVX usage, encryption/decryption cards, etc.) and locates the most suitable node for each packet processing function by matching the hardware with the processing task.

Figure 6:
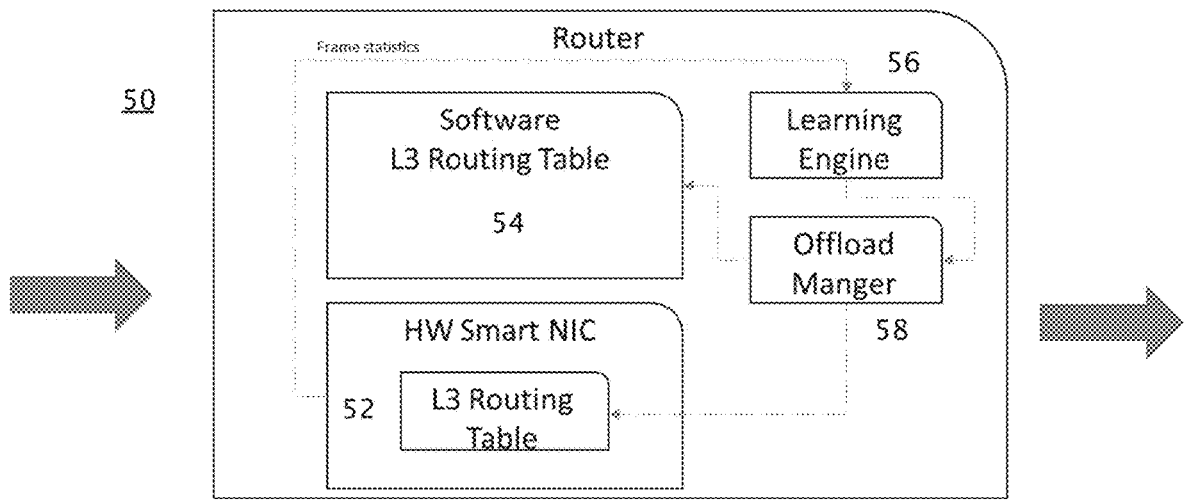
FIG. 6 is schematically illustrates an exemplary router system that utilizes embodiments of the present invention.

FIG. 6 schematically illustrates an embodiment of the present system implemented in a router device 50. Router 50 includes a HW routing table 52 that is limited in size, and a typically larger SW routing table 54 that is limited by the amount of RAM available to the host CPU. An offload manger 58 and learning engine 56 of the SW layer of router 50 will adjust the routing rules layout according to learning engine 58 recommendation and prediction.

Figure 7:
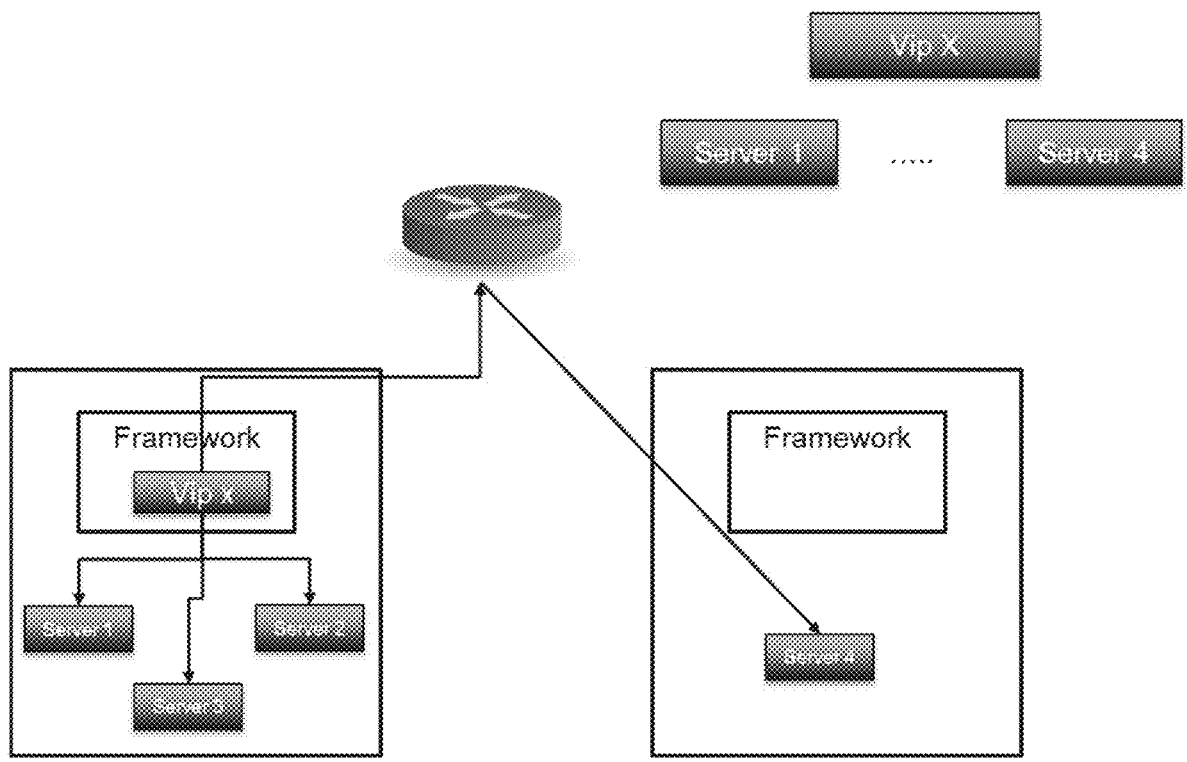
FIG. 7 is schematically illustrates a system that includes location-based load balancing functions.

FIG. 7 schematically illustrates an embodiment of the present system configured for location-based learning of distributed load balancer functions. A VIP SW/HW function that is located based on the learning closer to the majority of the served server backbends.

Figure 8:
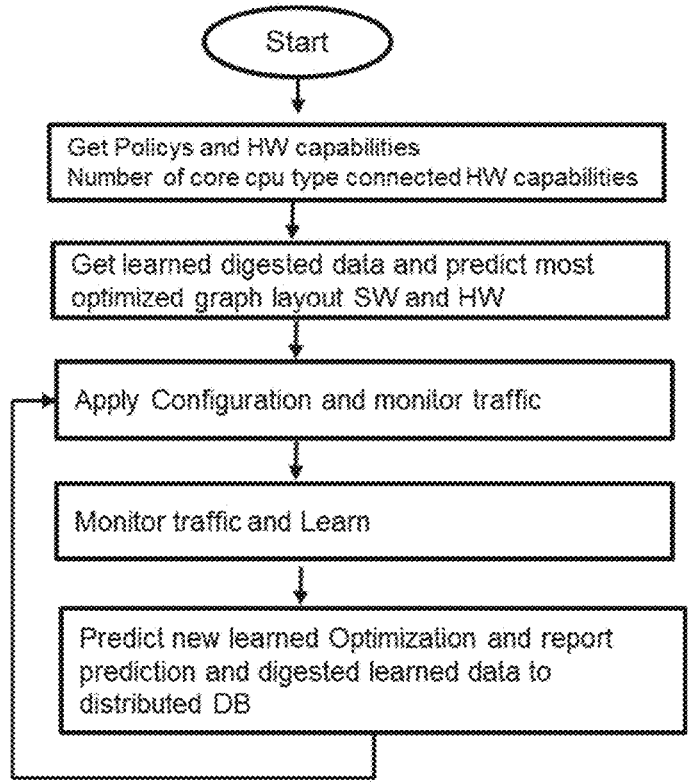
FIG. 8 is a flow chart outlining the high level process of the learning engine of the present invention.

The flowchart of FIG. 8 outlines the processing of data at the learning engine and the offload manger in order to set an optimal HW/SW path for packet processing. As is shown in this Figure, in the first step, the learning engine and the offload manager read a configuration policy and identify the HW capabilities of the computing platform (e.g. number of cores, core frequency, supported SIMD instruction, cache size and other built in capabilities). The learning engine and offload manger will then identify the packet processing capabilities of the attached HW devices (e.g., supported features set, memory limitation per feature, bandwidth, latency, number of virtual functions (SR-IOV), buffer sizes, oversubscription capabilities, any other HW acceleration unit or feature available on the HW).

In step 2, the learning engine will recommend an optimized layout of rules for the SW and HW layers that results in an optimized HW/SW processing pipeline for a specified configuration and policy.

In step 3, the offload manger will apply the rules recommended by the learning engine and translate the configured rule/policy into HW and SW rules.

In step 4, the learning engine and offload manager will monitor the traffic stream, inline or in port mirroring mode or obtain digested data mirroring information and perform learning to try and predict patterns and configuration improvements.

In step 5, once the learning engine detects a pattern, it will predict an improvement by changing the processing pipeline layout (HW/SW layout) by moving one or more rules from SW to HW or vice versa.

Thus, embodiments of the present system include a software framework configured for enhancing packet processing in network nodes. Embodiments of the present system provides the following advantages over existing packet processing pipelines:

(i) The system is devoid of HW limitations relating to configuration table size, reprocessing and reducing the policy to the lower dominator;
(ii) The system is more flexible, scalable on demand and can run anywhere;
(iii) The system can identify and learn the exact resources needed in order to run efficiently and free unneeded resources to the user workloads thereby also reducing power consumption;
(iv) The system can help enforce application restrictions when it comes to software and hardware combinations, like latency and performance;
(v) The system can help bridge between software-based applications and help accelerate workloads in hardware in an efficient manner; and
(vi) The system can apply machine learning to networking applications and adjust the processing path accordingly.

In addition to the above, embodiments of the present system also provide functions and features that cannot be implemented in HW-based processing pipelines including, for example, stateful services (Stateful Firewall, Stateful NAT), coverage services, security services, load balancing services as well as reducing header and metadata parsing repetitions in a packet processing pipeline.

As used herein the term "about" refers to ±10%.

Additional objects, advantages, and novel features of the present invention will become apparent to one ordinarily skilled in the art upon examination of the following examples, which are not intended to be limiting.

Examples

Reference is now made to the following examples, which together with the above descriptions, illustrate the invention in a non limiting fashion.

Packet Encapsulation and Decapsulation Using Combined SW and HW Processing

Encapsulating and decapsulation packets are, in most cases, computationally intensive tasks that are typically effected via dedicated HW or via SW only. The present example describes a system that combines both HW and SW processing and includes a learning engine and an offload manger to predict and decide the best layout of the configured rules for HW and SW processing.

An overlay gateway provides endpoints configuration to connect a physical network, in most cases Ethernet traffic with HW supported VLAN tags, to a virtual network overlay. For the following example, a Virtual Extensible LAN (VXLAN) is used although the present system can be implemented with any encapsulation standard.

VXLAN endpoints, which terminate VXLAN tunnels and may be either virtual or physical switch ports, are known as VXLAN tunnel endpoints (VTEPs). An Overlay Gateway or in this case VXLAN gateway is a VTEP endpoint which provides encapsulation of VLAN or Ethernet traffic from a physical network to a VXLAN based virtual network, and decapsulation of VXLAN traffic from the virtual network to VLAN or basic Ethernet traffic in the physical network.

VXLAN defines a MAC-in-UDP encapsulation scheme where the original Layer 2 frame has a VXLAN header added and is then placed in a UDP-IP packet. It adds a full Ethernet outer header and a full IP outer header plus a specific VXLAN header and thus provides the means to extend Layer 2 segments across the data center network.

Figure 9:
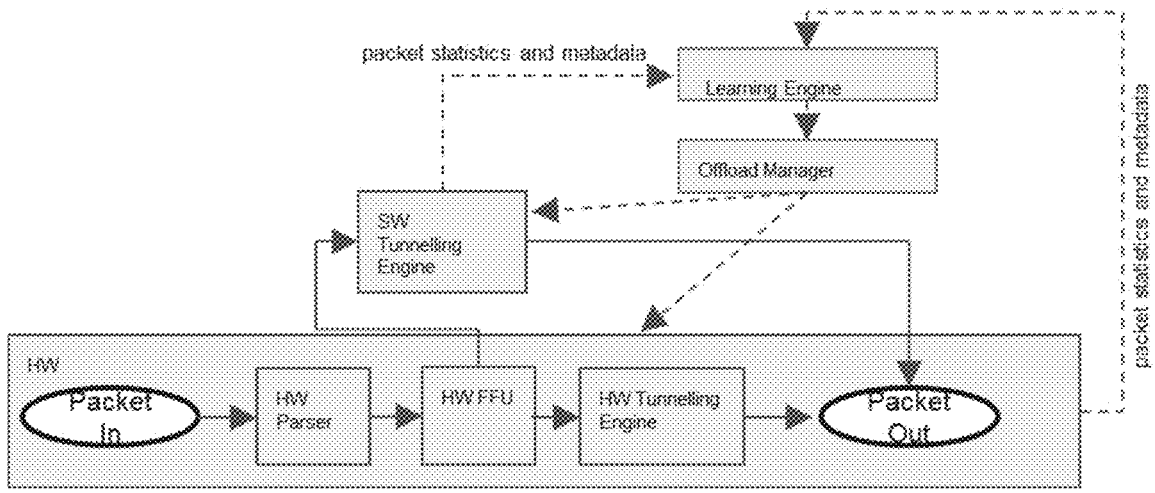
FIG. 9 illustrates an exemplary simplified high level view of an overlay encapsulation Gateway that utilizes embodiments of the present invention.

FIG. 9 illustrates a system with HW and SW capabilities of encapsulating packets based on a header match, and decapsulation based on the virtual overlay header—in the VXLAN case the VNID (logical Layer 2 segment ID).

Figure 10:
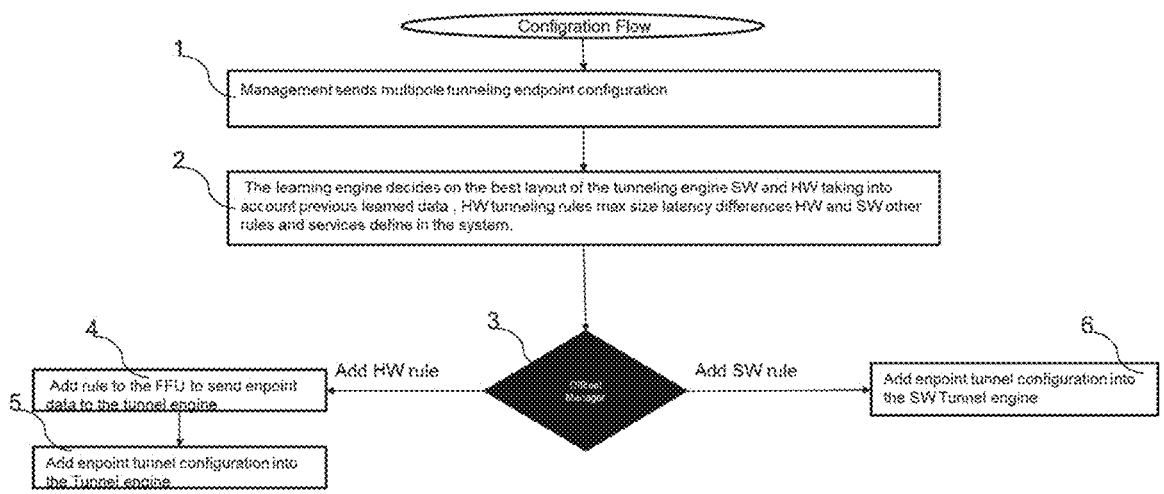
FIG. 10 is a flow chart outlining configuration flow for the system of FIG. 9.

FIG. 10 illustrates the processing steps carried out by the system of FIG. 9 when a new encapsulation/decapsulation endpoint configuration is received thereby.

In step 1, the system receives/reads the configured rules and forwards them to the learning engine. In step 2 the learning engine decides on the best layout of the tunneling engine endpoints rules for SW and HW, taking into account previous learned data, HW tunneling rules max size latency differences HW/SW, rules set and services defined in the system. In step 3, the offload manger applies an endpoint configuration to SW/HW based on the learning engine's recommendations. In step 4, the offload manger adds a rule to the HW FFU table to send all the endpoint traffic to the tunneling engine. In Step 5, the offload manger adds an endpoint rule to the tunneling engine and in step 6, the offload manger adds the endpoint rule to the SW tunneling engine.

Figure 11:
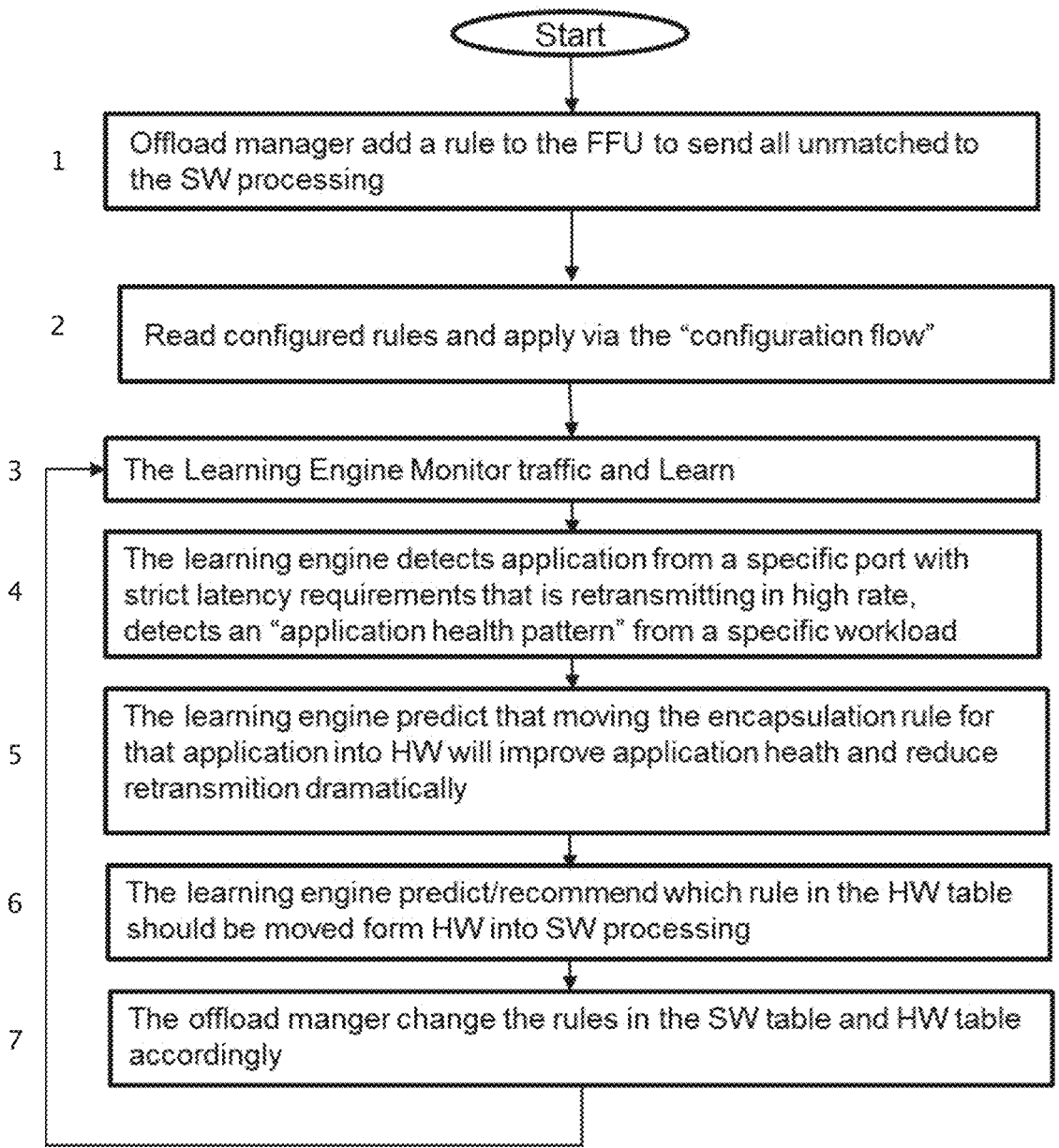
FIG. 11 is a flow chart outlining the work flow of the system of FIG. 9.

FIG. 11 is a flow chart outlining the work flow of the system of FIG. 9.

In step 1, the system initialize the HW pipeline by adding a default rule to the FFU to send any packet that does not match a HW rule (unmatched packets) to the SW layer. In step 2, the system reads/receives the configured rules and policy for this system and applies it to the flow chart of FIG. 10. In step 3, the system monitors the traffic stream (inline, in port mirroring mode or via digested data mirroring information) and performs learning to try and predict patterns and configuration improvements. In step 4, the learning engine detects an application from a specific port with strict latency requirements that is retransmitting in high rate, and detects an "application health pattern" (e.g., high rate of retransmitting TCP packets, adaptive video stream with short peak to high resolution video, timeouts and reconnections etc.) from a specific workload. In step 5, the learning engine predicts that moving an endpoint encapsulation rule for that application into HW will improve application heath and reduce retransmission dramatically. In step 6, the learning engine predicts/recommends which rule in the HW table should be moved from HW to SW processing and in step 7 the offload manger changes rules of the SW table and HW table accordingly.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for processing packets in a network, said system comprising a processor of a computer, said processor configured to execute software instructions to implement a method, said method comprising:
   accessing, by the processor, multiple packets flowing into a hardware (HW) packet processing pipeline of a node in the network, said hardware packet processing pipeline configured to process the flowing multiple packets by hardware in the hardware packet processing pipeline;
   identifying, by the processor, multiple patterns in the multiple packets; and
   based on the identified multiple patterns in the multiple packets, ascertaining for each packet of the multiple packets whether said each packet is to be processed by the hardware in the hardware packet processing pipeline or is to be executed via a software framework by software in a computing platform, wherein the computing platform is distinct from the hardware packet processing pipeline, wherein said ascertaining ascertains that first packets of the multiple packets are identified with a first pattern of the multiple patterns and second packets of the multiple packets are identified with a second pattern of the multiple patterns, wherein the multiple packets consist of the first packets and the second packets, wherein the first packets and the second packets are mutually exclusive, and wherein the first pattern and the second pattern are different patterns;
   based on said ascertaining, routing, by the processor, the first packets into the hardware packet processing pipeline in which the first packets are processed by the hardware in the hardware packet processing pipeline and offloading the second packets to the computing platform that processes second packets by the software that is executed via the software framework, and wherein said offloading is initiated while the second packets are in the hardware packet processing pipeline and before the second packets can be processed by the hardware in the hardware packet processing pipeline.

2. The system of claim 1, wherein said identifying the at least one pattern comprises classifying the multiple packets flowing into the hardware packet processing pipeline over a time period to identify the at least one pattern.

3. The system of claim 2, wherein said classifying the multiple packets is implemented by a learning engine configured for parsing a header and/or a payload of each packet of the multiple packets.

4. The system of claim 3, wherein the learning engine classifies the multiple packets over time to predict a packet processing efficiency of the hardware packet processing pipeline or the software framework.

5. The system of claim 1, wherein the at least one pattern correlates with a time of day the multiple packets are flowing into the hardware packet processing pipeline.

6. The system of claim 1, wherein the at least one pattern is selected from the group consisting of recurrent volume of traffic, volume per application, application behavior, endpoint locations, statistical security risk, known security attack patterns, short peak volume, client types, protocol health, application health, and user workload statistics.

7. The system of claim 1, wherein the software framework is configured for rerouting packets of the second packets back to the hardware packet processing pipeline of the network.

8. The system of claim 1, wherein the hardware packet processing pipeline includes at least one type of a network device selected from the group consisting of a router, a bridge, a gateway, a firewall, and a switch.

9. The system of claim 1, wherein said routing is effected by an offload manager.

10. The system of claim 1, wherein the at least one pattern identifies packets of the multiple packets not matching routing rules stored by the hardware packet processing pipeline.

11. The system of claim 1, wherein the software framework is configured for routing packets of the second packets processed by the computing platform to a different node in the network.

12. The system of claim 1, wherein the software framework configures the hardware packet processing pipeline or a rule table thereof to handle the first packets based on said identifying.

13. The system of claim 1, wherein the at least one pattern comprises a time based pattern identifying a peak packet flow, and wherein the first packets includes less packets than the second packets.

14. The system of claim 1, wherein the at least one pattern comprises an attack pattern and the software framework modifies the hardware packet processing pipeline and/or the computing platform to include security functions.

15. The system of claim 1, said system comprising a plurality of software framework units, each software framework unit serving a virtual IP address assigned to a plurality of servers.

16. The system of claim 1, wherein the software performs, on the second packets, those hardware functions that would have been performed on the second packets by the hardware in the hardware packet processing pipeline if the second packets was not offloaded and had continued to flow in the hardware packet processing pipeline.

17. The system of claim 1, wherein the hardware in the hardware packet processing pipeline consists of at least three sequentially ordered HW processing units comprising in sequential order: a first HW processing unit, a second HW processing unit, and at least a third HW processing unit, and wherein each packet of the multiple packets entering the HW packet processing pipeline:
   initially enters the first HW processing unit which parses said each packet;
   next enters the second HW processing unit which performs said ascertaining for said each packed; and
   next enters the third HW processing unit if said each packet is ascertained by the second HW processing unit to be identified with the first pattern or enters the computing platform that processes the second packets by the software that is executed via the software framework if said each packet is ascertained by the second HW processing unit to be identified with the second pattern.

* * * * *